United States Patent [19]

Suzuki et al.

[11] 4,348,095
[45] Sep. 7, 1982

[54] STRAP MOUNTING DEVICE

[75] Inventors: Toyotosi Suzuki, Tokyo; Nobuhiro Ago, Yokohama, both of Japan

[73] Assignee: Canon Kabushiki Kaisha, Tokyo, Japan

[21] Appl. No.: 272,380

[22] Filed: Jun. 10, 1981

[30] Foreign Application Priority Data

Jun. 11, 1980 [JP] Japan .................................. 55-81446

[51] Int. Cl.³ .................... G03B 17/02; G03B 29/00
[52] U.S. Cl. .................................... 354/288; 354/82
[58] Field of Search ....................... 354/288, 293, 82; 368/282

[56] References Cited

U.S. PATENT DOCUMENTS

| 2,961,937 | 11/1960 | Karpf | 354/82 |
| 3,205,800 | 9/1965 | Peterson | 354/288 X |
| 3,938,166 | 2/1976 | Sloop | 354/82 |
| 4,109,264 | 8/1978 | Pizzuti et al. | 354/288 X |
| 4,153,362 | 5/1979 | Dietz et al. | 354/293 |

Primary Examiner—Donald Griffin
Attorney, Agent, or Firm—Toren, McGeady & Stanger

[57] ABSTRACT

Disclosed is the strap mounting device for a camera having a battery loading chamber for loading a plural number of unit type batteries along the internal wall of the one side of the camera, so designed that the camera holding strap is brought through the space between the concave portion of the battery loading chamber and the internal wall of one side of the camera through a pair of holes provided vertically at the side of the camera.

4 Claims, 5 Drawing Figures

STRAP MOUNTING DEVICE

BACKGROUND OF THE INVENTION

1. Field of the Invention

The present invention refers to the strap mounting device for camera, particularly for mounting the strap at one side of the camera.

2. Description of the Prior Art

Generally, the strap of a portable instrument, for example, a camera is mounted on the hanging fittings provided at both sides of the camera. However, the camera rececltly is becoming more and more compact, whereby a pair of hanging fittings are provided at the upper and the lower part of one side of the camera body so as to mount the strap. The strap mounting method as mentioned above is convenient for holding the camera at the time of taking a picture, whereby a strap mounting device such as shown in FIG. 1 (a) and FIG. 1 (b) is recommended. In the drawing, 1 is the holder consisting of rubber and the like through which the strap belt is to be brought, 2 and 3 are the hanging fittings provided at the one side of the camera and 9 is the strap belt. In order to mount the strap 9 on this mounting device, as is shown in FIG. 1 (b) both of the ends of the strap belt are brought through the hanging fittings of the camera, then inserted at both ends of the holder 5 and put together over each other. Then the strap is pulled so as to be fixed as is shown in FIG. 1 (a). By means of such a conventional mounting device at one side of the camera, the holder and the hanging fittings project from the side of the camera, which is inconvenient for holding the camera at the time of taking a picture.

It is an object of the present invention to provide a strap mounting device free from the shortcomings of the conventional method as mentioned above, be designing the device in such a manner that a part of the strap is mounted inside of the camera, whereby the dead space between the battery loading chamber and the internal wall of the one side of the camera is made use of as the space through which the strap is brought in the camera.

Other object of the invention will be obvious from the explanations to be made below in a concrete way in accordance with the embodiment.

BRIEF DESCRIPTION OF THE DRAWINGS

FIG. 1 (b) is to explain how to mount the strap on the holder shown in FIG. 1.

DESCRIPTION OF THE PREFERRED EMBODIMENTS

Below an embodiment in accordance with the present invention will be explained in accordance with the accompanying drawings.

Figure 1A:
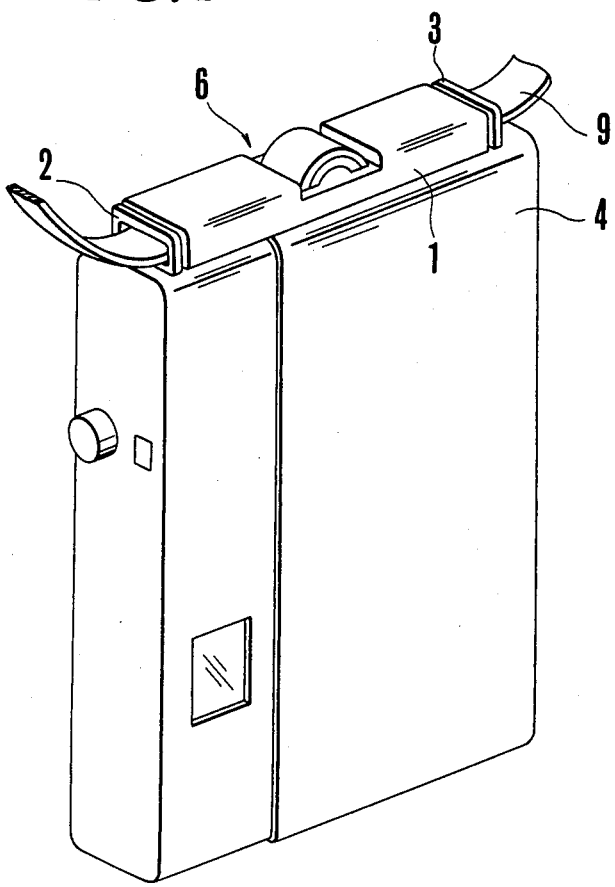
FIG. 1 (a) shows the conventional strap mounting device in prespective view.
Figure 1B:
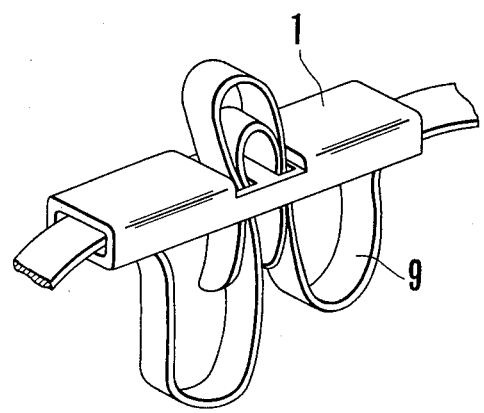
Figure 2:
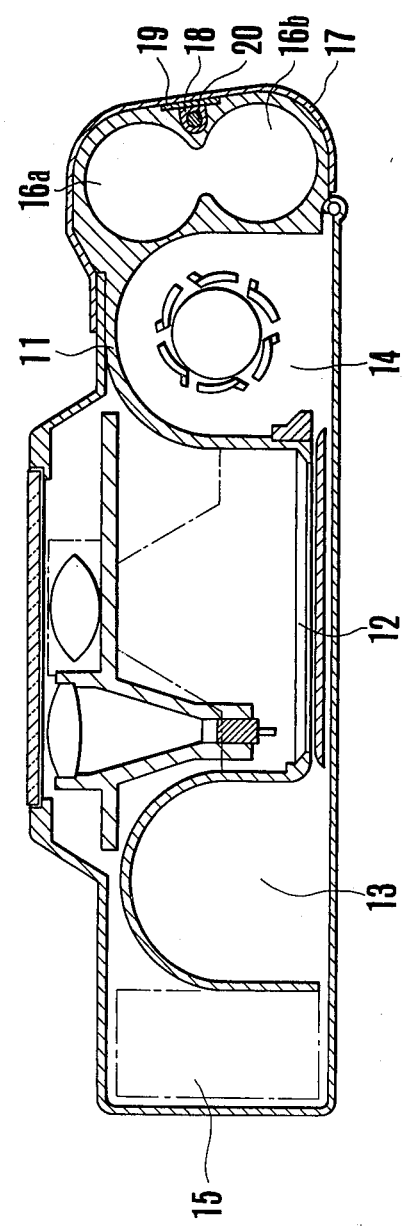
FIG. 2 shows an embodiment of the present invention, whereby the internal construction of the camera having the strap mounting device is shown.

FIG. 2 shows the internal construction of the camera. In the drawing 11 is the camera body formed of plastics, consisting of the film loading chamber 13 and the film winding chamber 14, between which chambers the aperture portion is provided, while outside of the film loading chamber 13, a space 15 for loading the speed light device is provided. Further outside of the film winding chamber 14, the battery loading circular parallel chambers 16a and 16b are provided so as to contain for example 2 unit type batteries. The plastic circumference of the camera body forming the battery loading chambers 16a, 16b is covered with the cover 17 so as to form the grip portion. 18 is the strap loading portion provided between the two battery loading chambers 16a and 16b on the one hand and the cover 17 constituting a part of the external wall of the camera on the other hand, whereby the strap loading portion 18 is cut vertically so that the plastic portion of the camera body lies along the battery loading chambers 16a and 16b. 19 is the pressure plate for locking the strap loading portion 18, being fixed on the camera body 11 so as to make a part of the side wall of the camera body, making one body with the camera body. On both sides of the pressure plate 19, the holes 19a and 19b for taking out the round strap 20 are provided. Further in order to take out the strap 20 the cover 17 is cut at the parts corresponding to the holes 19a and 19b.

As mentioned above the dead space existing between the battery loading chamber provided along the one side of the camera and the internal wall of the side of the camera is made use of in order to constitute the strap mounting device, while on the external side of the camera only the holes for the strap are provided so that unlike the conventional strap mounting device there is no projection and, therefore, the strap mounting portion presents no obstacle at the time of taking a picture as well as carrying the camera.

Figure 3:
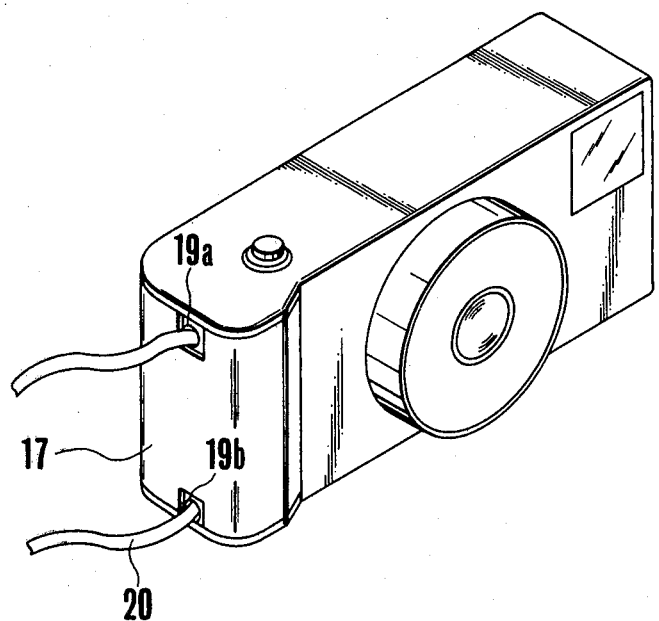
FIG. 3 shows the external appearance of the camera shown in FIG. 2.
Figure 4:
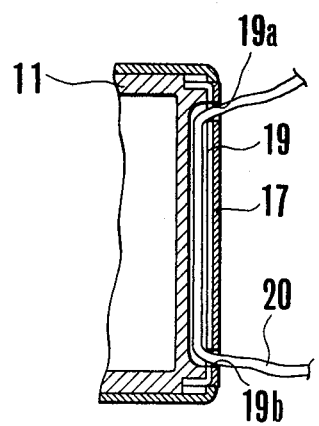
FIG. 4 shows the strap mounting portion shown in FIGS. 2 and 3 in detailed section.

Although in the disclosed embodiment use is made of the dead space between the chamber for loading a plural number of batteries and the internal side wall, it should be understood that not only the dead space between the batteries but also for example the dead space between the main condenser of the built-in speed light device and the main condenser can be made use of. Further, it should be understood that instead of cord shaped straps as shown FIGS. 2 to 4 the belt shaped ones can also be used, whereby they can be fixed against the slide.

What is claimed is:

1. A portable instrument with a strap mounting device comprising:

a side wall defining part of said portable instrument;

a battery loading chamber provided aside said portable instrument, said chamber having a shape corresponding to the shape of a battery to be contained therein;

a space provided between said battery loading chamber and said side wall, said space being a dead space formed by the shape of said battery loading chamber;

a strap loading portion provided in said dead space; and an opening formed through said side wall at a position corresponding to the end portion of said strap loading portion, said opening being arranged to permit take-out of a strap therethrough.

2. A portable instrument according to claim 1 wherein said strap loading portion is formed by notching the dead space along the battery loading chamber.

3. A portable instrument according to claim 2 further comprising a locking plate for closing said strap loading portion, said plate forming part of said side wall.

4. A portable instrument according to claim 1 wherein an opening is formed at two positions corresponding to both end portions of the strap loading portion.

* * * * *